United States Patent [19]

Cooper et al.

[11] Patent Number: 5,809,282

[45] Date of Patent: Sep. 15, 1998

[54] AUTOMATED NETWORK SIMULATION AND OPTIMIZATION SYSTEM

[75] Inventors: Dennis Cooper; George Thompson, both of Santa Barbara, Calif.

[73] Assignee: GRC International, Inc., Santa Barbara, Calif.

[21] Appl. No.: 483,971

[22] Filed: Jun. 7, 1995

[51] Int. Cl.$^6$ .............................. G06F 3/00; G05B 13/00
[52] U.S. Cl. .............. 395/500; 395/200.01; 395/200.02; 395/527; 395/50; 395/60; 364/148; 364/513; 364/578
[58] Field of Search ................................ 395/500, 50, 51, 395/60, 908, 909, 200.01, 200.02, 200.03, 527; 364/148, 513, 578

[56] References Cited

U.S. PATENT DOCUMENTS

| | | | |
|---|---|---|---|
| 3,579,191 | 5/1971 | Andreae | 340/172.5 |
| 3,626,375 | 12/1971 | Koziol | 307/114 |
| 4,081,612 | 3/1978 | Hafner | 370/393 |
| 4,368,509 | 1/1983 | Li | 364/148 |
| 4,472,770 | 9/1984 | Li | 364/148 |
| 4,495,559 | 1/1985 | Gelatt, Jr. et al. | 364/148 |
| 4,547,880 | 10/1985 | DeVita et al. | 370/91 |
| 4,710,864 | 12/1987 | Li | 364/148 |
| 4,771,424 | 9/1988 | Suzuki et al. | 370/86 |

(List continued on next page.)

FOREIGN PATENT DOCUMENTS

| | | | |
|---|---|---|---|
| 0087174 | 8/1983 | European Pat. Off. | G11B 7/00 |
| 0216704 | 4/1987 | European Pat. Off. | G11B 27/30 |
| 0226960 | 7/1987 | European Pat. Off. | G11B 27/10 |
| 0276326 | 7/1987 | European Pat. Off. | G11B 7/00 |
| 0245821 | 11/1987 | European Pat. Off. | G11B 7/013 |

OTHER PUBLICATIONS

Mulqueen, John T., "Network–Modeling Tools Cut Costs," Communications Week, Aug. 10, 1992, pp. 1; 54.

The IPX Product Family System Description (1990 Strata-Com, Inc.), pp. 1–29, 31–65, 67–107, 110–114.

Bouloutas et al., "Some Graph Partitioning Problems and Algorithms Related to Routing in Large Computer Networks," International Conf. on Distributed Computing Sep., Jun. 5, 1989, pp. 362–370.

Smith et al., "HP Open View Windows: A User Interface for Network Management Solutions," Hewlett–Packard Journal, Apr. 1990, pp. 60–65.

(List continued on next page.)

*Primary Examiner*—Kevin J. Teska
*Assistant Examiner*—Thai Phan
*Attorney, Agent, or Firm*—Finnegan, Henderson, Farabow, Garrett & Dunner, L.L.P.

[57] ABSTRACT

A system for selecting options for modifying a network architecture in accordance with user preferences using a knowledge base and a database. The knowledge base includes rules to select modification categories and the database includes information on a plurality of equipment and a plurality of tariffs. To select the options, the system generates a base-line simulation from the network architecture, which base-line simulation includes performance data on the network architecture under a predetermined scenario. Modification categories based on the user preferences are selected using rules in the knowledge base, and equipment information and tariff information corresponding to the network modification categories are selected from the database to create modification options for the network modification categories. The modification options are evaluated using rules in the knowledge base. The system then generates a plurality of new simulations of the network architecture as modified by the modification options, and compares the performance data of the base-line simulation with performance data of the new simulations to specify differences in performance data between the base-line simulation and each new simulation. Finally, the modification options (each corresponding to one of the new simulations) are ranked using the specified differences in performance data between the base-line simulation and each new simulation, user preferences, and rules of the knowledge base.

11 Claims, 9 Drawing Sheets

U.S. PATENT DOCUMENTS

| | | | |
|---|---|---|---|
| 4,790,005 | 12/1988 | Hanselka et al. | 379/244 |
| 4,807,108 | 2/1989 | Ben-Arieh et al. | 364/148 |
| 4,845,633 | 7/1989 | Furtek | 364/490 |
| 4,860,276 | 8/1989 | Ukita et al. | 369/119 |
| 4,866,605 | 9/1989 | Nakano et al. | 364/200 |
| 4,866,663 | 9/1989 | Griffin | 364/900 |
| 4,868,770 | 9/1989 | Smith et al. | 364/578 |
| 4,905,233 | 2/1990 | Cain et al. | 370/94.1 |
| 4,910,660 | 3/1990 | Li | 364/148 |
| 4,918,620 | 4/1990 | Ulug | 364/513 |
| 4,939,668 | 7/1990 | Brown et al. | 364/513 |
| 4,953,106 | 8/1990 | Gansner et al. | 364/521 |
| 4,956,835 | 9/1990 | Grover | 370/228 |
| 4,965,743 | 10/1990 | Malin et al. | 364/513 |
| 4,974,224 | 11/1990 | Boone | 370/400 |
| 4,984,264 | 1/1991 | Katsube | 379/197 |
| 5,014,262 | 5/1991 | Harshavardhana | 370/16 |
| 5,019,961 | 5/1991 | Addesso et al. | 364/192 |
| 5,019,992 | 5/1991 | Brown et al. | 364/468 |
| 5,029,075 | 7/1991 | Hirasawa | 364/200 |
| 5,038,294 | 8/1991 | Arakawa et al. | 364/491 |
| 5,067,148 | 11/1991 | Sardana | 379/111 |
| 5,072,412 | 12/1991 | Henderson, Jr., et al. | 395/159 |
| 5,079,690 | 1/1992 | Li | 364/148 |
| 5,079,760 | 1/1992 | Nemirovsky et al. | 370/17 |
| 5,095,444 | 3/1992 | Motles | 364/514 |
| 5,115,495 | 5/1992 | Tsuchiya et al. | 395/200 |
| 5,136,690 | 8/1992 | Becker et al. | 395/161 |
| 5,163,042 | 11/1992 | Ochiai | 370/17 |
| 5,175,800 | 12/1992 | Galis et al. | 395/51 |
| 5,197,127 | 3/1993 | Waclawsky et al. | 395/200 |
| 5,208,768 | 5/1993 | Simoudis | 364/578 |
| 5,216,591 | 6/1993 | Nemirovsky et al. | 364/401 |
| 5,218,676 | 6/1993 | Ben-Ayed et al. | 395/200 |
| 5,253,161 | 10/1993 | Nemirovsky et al. | 364/402 |
| 5,261,044 | 11/1993 | Dev et al. | 395/159 |
| 5,265,241 | 11/1993 | Arnold et al. | 395/575 |
| 5,274,643 | 12/1993 | Fisk | 370/94.1 |
| 5,276,789 | 1/1994 | Besaw et al. | 395/140 |
| 5,283,857 | 2/1994 | Simoudis | 395/77 |
| 5,295,244 | 3/1994 | Dev et al. | 395/161 |
| 5,335,339 | 8/1994 | Maejima et al. | 395/500 |
| 5,381,404 | 1/1995 | Sugano et al. | 370/13 |
| 5,394,540 | 2/1995 | Barrington et al. | 395/500 |
| 5,404,451 | 4/1995 | Nemirovsky et al. | 395/200 |
| 5,408,526 | 4/1995 | McFarland et al. | 379/302 |
| 5,410,634 | 4/1995 | Li | 395/10 |
| 5,426,674 | 6/1995 | Nemirovsky et al. | 395/200 |
| 5,428,619 | 6/1995 | Schwartz et al. | 370/20.1 |
| 5,436,909 | 7/1995 | Dev et al. | 371/20.1 |
| 5,440,719 | 8/1995 | Hanes et al. | 395/500 |
| 5,452,415 | 9/1995 | Hotka | 395/161 |

OTHER PUBLICATIONS

"Layout Algorithm for Computer Network Management Graphics," IBM Technical Disclosure Bulletin, vol. 30, No. 12, 5188, pp. 268–277.

Somers, F., et al., World Telecommunications Congress (International Switching Symposium), Advanced Switching Technologies for Universal Telecomunications at the Beginning of the 21st Century, "Intelligent Resource Dimensioning in ATM Networks," Berlin, Apr. 1995, vol. 2, pp. 62–66.

Jander M., "An On–Screen Decision Maker," Data Communications, vol. 23, No. 6, Apr. 1, 1994, pp. 49–50.

Fink, G.V., "Innovative Network Modeling and Simulation Tool," Proceedings of the Military Communications Conference (MILCOM), Long Branch, N.J., Oct. 2–5, 1994, vol. 1 of 3, Oct. 2, 1994, Institute of Electrical and Electronics Engineers.

International Search Report PCT/US 96/09899.

"Mycom Computer Communications Model," G. Thompson, dated Jul. 1989, pp. 1–45.

"Having a Network Nightmare? Let the Software Take Over," The New York Times, Lawrence M. Fisher, dated Sep. 18, 1994.

"NetSolve Supported Tariffs," Quintessential Solutions, dated Dec. 1994 (65 pages).

"Netmaker XA 'Tools For Tasks'," Make Systems, Inc. (1994), (4 pages).

"Netmaker Products," Make Systems (undated) (1 page).

"Make support HP probe with NetMaker XA network analyzer," Bob Wallace, Info World, vol. 16, Issue 51, dated Dec. 19, 1994, (1 page).

"Fact Sheet," Make Systems, dated Apr. 4, 1994 (1 page).

"Software The New Breed—Making A Big Splash," Information Week, dated Oct. 24, 1994, (6 pages).

"Letter to Mr. George Thompson," from Eric R. Chapman, Product Manager, CACI Products Company, dated Mar. 20, 1995, (3 pages).

"Simulation Products and Projects," CACI (undated) (pp. 1–33).

"Simulation Made Simpler," Mary Jander, Data Communications, dated Aug. 1992 (2 pages).

"OPNET Corporate Background," Prentice–Hall, MIL 3, Inc. (1993) (2 pages).

"OPNET Model Library," MIL 3, Inc. (1994) (pp. 1–2).

"Modeling Tomorrow's High Speed Networks," OPNET Application Series, MIL 3, Inc. (1992) (1 page).

"Modeling ATM Switch Architectures," OPNET Application Series, MIL 3, Inc. (1992) (1 page).

"Modeling Intelligent Communications Controllers," OPNET Application Series, MIL 3, Inc. (1992) (1 page).

"Modeling Packet Radio Networks of the Future," OPNET Application Series, MIL 3, Inc. (1992) (1 page).

"Modeling Linked Air–Ground Networks," OPNET Application Series, MIL 3, Inc., 1992 (1 page).

"Modeling the Public Switched Network Under Severe Overload," OPNET Application Series, MIL 3, Inc., 1993 (1 page).

"Overview," OPNET Modeler, MIL 3, Inc., (undated) (pp. 1–6).

"Modeling Radio Nets, Satellites, and Mobility," OPNET Modeler/Radio, MIL 3, Inc., 1992 (2 pages).

"Products and Services," Network General Corporation, (1994), (pp. 1–12).

"Telecom Network Simulation Models," JADE, (undated) (1 page).

WANDL, Inc., vol. 9, Issue 2, dated Mar. 1995 (3 pages).

"Network Planning and Analysis Tools," WANDL, Inc. (1994) (21 pages).

"Network User's Guide," Quintessential Solutions, dated Jun. 19, 1995.

"Network Planning and Analysis Tools," WANDL, Inc., dated Nov. 29, 1994, (pp. 2–11).

SCENARIO DATA

| APPLICATION | SOURCE | DESTINATION | MEDIA | VOLUME Mbytes | TIME | DATA RATE Mbps |
|---|---|---|---|---|---|---|
| FINANCE | NEW YORK | DALLAS | DATA | 150 | 16:15 | 0.35 |
|  | LOS ANGELES | CHICAGO | DATA | 100 | 13:45 | 0.25 |
|  | DALLAS | LOS ANGELES | DATA | 80 | 16:15 | 0.20 |
|  | CHICAGO | DALLAS | DATA | 50 | 17:15 | 0.35 |
| MANAGEMENT | NEW YORK | LONDON | VOICE | 900 | 8:15 | 0.32 |
|  | NEW YORK | LOS ANGELES | VOICE | 750 | 13:20 | 0.26 |
|  | LOS ANGELES | CHICAGO | VOICE | 450 | 11:45 | 0.24 |
|  | DALLAS | CHICAGO | VOICE | 95 | 11:30 | 0.24 |
|  | CHICAGO | LONDON | VOICE | 75 | 8:15 | 0.15 |
|  | NEW YORK | LOS ANGELES | FAX | 1200 | 10:15 | 0.47 |
|  | NEW YORK | LONDON | FAX | 1500 | 14:35 | 0.53 |
|  | LOS ANGELES | NEW YORK | FAX | 950 | 11:55 | 0.45 |
|  | DALLAS | CHICAGO | FAX | 205 | 11:30 | 0.33 |
|  | CHICAGO | DALLAS | FAX | 150 | 11:15 | 0.30 |
| MARKET/SALES | NEW YORK | CHICAGO | DATA | 200 | 12:15 | 0.35 |
|  | LOS ANGELES | LONDON | DATA | 175 | 14:25 | 0.25 |
|  | DALLAS | LONDON | DATA | 100 | 16:10 | 0.20 |
|  | CHICAGO | NEW YORK | DATA | 60 | 17:00 | 0.12 |

*FIG. 6*

AUTOMATED NETWORK SIMULATION AND OPTIMIZATION SYSTEM

BACKGROUND OF THE INVENTION

1. Field of the Invention

This invention relates to automated systems for simulating network architectures and, more particularly, to systems for optimizing simulations of network architectures. The invention further facilitates the optimization of network architecture simulations by identifying and ranking options and combinations of options for altering a base-line network architecture simulation according to data on performance of the network architecture under defined traffic conditions and selected user preferences for maintaining and altering the network architecture.

2. Description of the Related Art

Computer and telecommunication networks have grown in size and complexity. Both of these factors have caused network designers, operators, and users to rely on modeling software to assist them in simulating network configurations. They use network simulations to evaluate performance of network configurations under defined traffic conditions. Performance includes such objective criteria as response time, throughput, and costs of transmissions.

While software companies offer a great selection of automated design and simulation software for such disciplines as automotive engineering, aerospace engineering, and integrated circuit engineering, few have developed programs for networking. Most of the network simulation programs that are available are not very user friendly. They generate reams of data, status reports, and warnings in a language that is not easily understandable to the user. Furthermore, the programs fail to evaluate a network simulation for both quantitative factors concerning performance and cost of the network under defined traffic conditions as well as user preferences of a qualitative nature.

User preferences are different for a network operator, i.e., a company operating a network, and network user, a company using the network operated by a network operator. For a network operator, user preferences include issues such as whether a network operator would like to down-size the network, decrease costs of operating and maintaining the network, upgrade network equipment, minimize transmission delays, minimize the number of messages lost during transmission, maximize network utilization at all times, and minimize network changes but satisfy other preferences and/or performance requirements. From a network user's perspective, preferences include issues such as minimizing costs of using another's network, minimizing delays in transmissions, minimizing the number of messages lost during transmission, changing service providers, changing from a public to a private provider, and making sure that state-of-the-art equipment is employed in the network. In a highly simplified example, two network architectures, one having extremely high performance and another having lower speed performance but requiring little attention from a network operator, could each be ranked most desirable by two different users.

Down-sizing a network concerns reducing the size of the network by, for example, removing redundant links that connect to common nodes, or removing one or more nodes from a network. In general, a network operator down-sizes in order to lower costs and make better utilization of the network. Operation and maintenance costs for a network include repair and replacement of broken equipment, software upgrades for communications computers, and salaries of support personnel. Network equipment (e.g., routers, switches, network management computers, etc.) will also be replaced with newer equipment with greater capabilities (i.e., speed, capacity, increased functionality, etc.). Network operators try to provide maximum throughput over their networks. This means minimizing delays that result in moving data packets from one node to another. Transmission delays can be caused by slow switches, poor routing algorithms, and overloaded links. A message is the term used to denote the information (media could be voice or data) that is being sent (i.e., transmitted) from one node to another. Network utilization is a measure of how often all the links in a network are being used near their capacity for the transmission of messages. Networks that have low utilization are ones that have excess capacity. Network changes can include installing new network equipment, establishing different communications protocols (i.e., the information coding scheme used to transmit messages), and adding new nodes and links to the network. Changing service providers (e.g., AT&T or MCI) means employing a different provider for all or part of the user network. Moving from public to private means changing from using a service provider to building your own network and providing your communications services in-house.

Because programs failed to evaluate a network simulation for both quantitative factors concerning performance and cost of the network under defined traffic conditions as well as user preferences of a qualitative nature, network operators and users rely on experienced people with a deep understanding of networks to propose seat-of-the-pants solutions to sophisticated network problems. For example, the network experts propose changes to the network configuration that satisfy the quantifiable needs of the network operator and users. When appropriate, they also propose network changes that coincide with other non-quantifiable qualitative concerns of the network operator and users.

But as networks grew ever more complex, linking local area networks (LANs) and wide area networks (WANs), hubs, routers, switches, and multiplexers in a multinational spider web of telecommunications links, the network experts could no longer rely on the basic simulation software. The basic simulation software could no longer effectively assist them in providing complete simulations of complex networks that would help identify appropriate options for altering the network as well as satisfy both the quantifiable needs of the network operator and users, and the qualitative concerns of the network operator and users.

Software companies thus began to provide newer software tools for network simulation. Though these tools provided some limited capabilities with regard to modeling (simulating) networks, using a more friendly user interface, they failed to automate effectively the process of identifying options for modifying network models to meet network operator and/or user demands. Furthermore, these programs still failed to address user preferences of a qualitative nature when providing options for altering a network simulation. They relied solely on evaluating network simulations for quantitative factors concerning performance of the networks being simulated under defined traffic conditions and identifying options for altering the networks based on those quantitative factors—forgetting altogether about the qualitative factors. Finally, existing software tools failed to rank the options for modifying the network to satisfy even the quantitative factors concerning performance of the networks under defined traffic conditions (or the qualitative factors that were not considered). Ranking is important because it would permit the network operator, designer, or user to make more informed decisions when considering various network modifications.

SUMMARY OF THE INVENTION

Accordingly, the present invention is directed to an automated network simulation and optimization system that substantially obviates one or more of the problems due to the limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as in the appended drawings.

To achieve the objects of this invention and attain its advantages, broadly speaking, this invention selects options for modifying a network architecture in accordance with user preferences. The selection process is performed in a data processing system including a knowledge base of rules used to select modification options. In the broadest sense, the selection process includes four steps: (1) generating a base-line simulation from a network architecture, with the base-line simulation including performance data on the network architecture under a predetermined scenario; (2) generating, using at least one rule in the knowledge base, modification options based on the user preferences; (3) generating a plurality of new simulations of the network architecture as modified based on the modification options; and (4) ranking the modification options, each corresponding to one of the new simulations, according to differences in performance data between the base-line simulation and each new simulation and according to the user preferences.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are incorporated in and which constitute part of this specification, illustrate a presently preferred implementation of the invention and, together with the description, serve to explain the principles of the invention.

In the drawings:

FIG. 6 is an exemplary listing of data for a scenario;

DESCRIPTION OF THE PREFERRED IMPLEMENTATION

Reference will now be made in detail to the preferred implementation of the present invention as illustrated in the accompanying drawings. Wherever possible, the same reference numbers will be used throughout the drawings and the following description to refer to the same or like parts.

Workstation

This invention is preferably implemented by a workstation or other data processing system, such as a workstation manufactured by Silicon Graphics. The architecture for and procedures to implement the present invention in the workstation, however, are not conventional. They provide for a unique approach to the generation of network simulations from a defined network architecture and under defined traffic conditions (i.e., a scenario), and the identification and selection of options and combinations of options to modify the network architecture in accordance with both quantitative data on performance and cost of the network architecture under the scenario and fully considering user preferences of a qualitative nature. The preferred implementation, which is disclosed hereinafter in functional schematic form, may be written in the C++ programming language.

Figure 1:
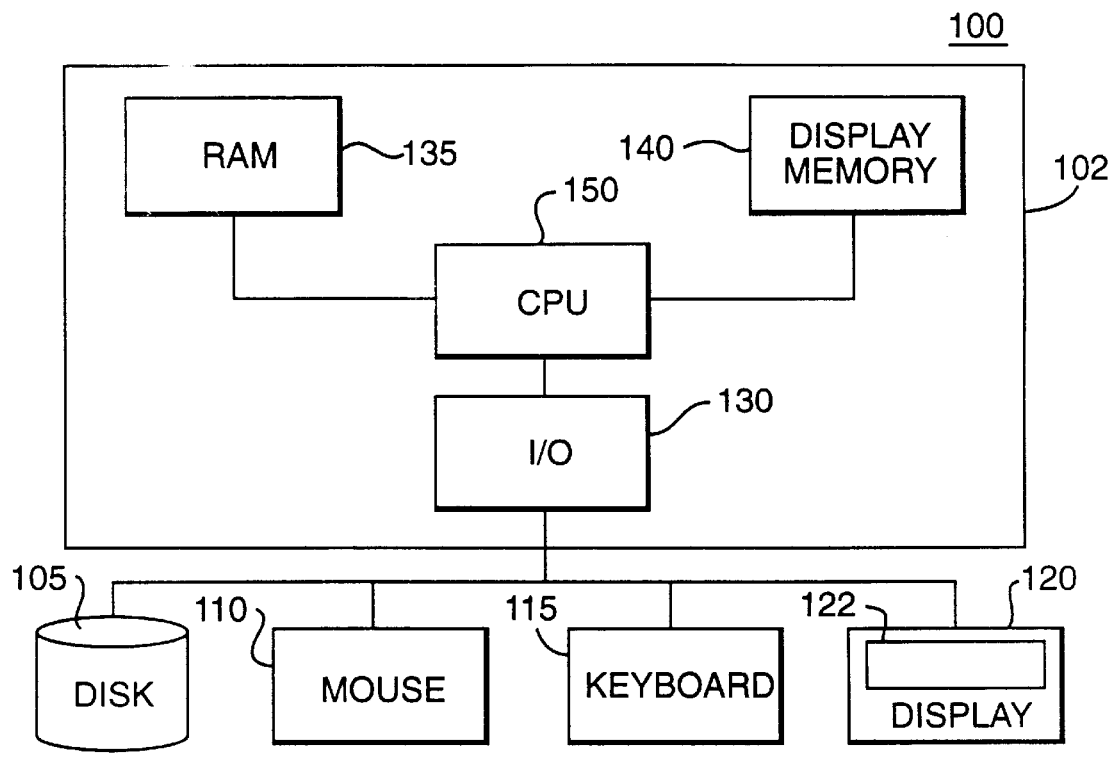
FIG. 1 is a block diagram illustrating the components of an exemplary workstation in which the present invention may be implemented.

Referring to FIG. 1, workstation 100 is comprised of a processor 102, a disk drive 105, a mouse 110, a keyboard 115, and a display 120. Workstation 100 may also optionally include other external devices such as printers and scanners (not shown).

Processor 102 is comprised of an input/output unit 130, a random access memory unit (RAM) 135, a display memory unit 140, and a central processing unit (CPU) 150. These units are all well known and operate under control of an operating system (e.g., Unix) to process various inputs and provide the outputs necessary to generate desired textual and graphic display information on display screen 122 of display 120 or other output unit such as an optional external device (e.g., printer).

Display memory 140 is a conventional video RAM (VRAM) which is used to store bit patterns (pixel data) which are read out by CPU 150 or a video interface circuit (not shown) in an appropriate synchronization with the display beam of the display 120 in order to provide the desired display of graphics and text. Disk drive 105 is also conventional and is provided to permit the ready interchange of control and application software and to provide a source of mass storage for workstation 100.

Mouse 110 of workstation 100 includes a roller ball and control buttons (not shown). The buttons actuate momentary contact switches to generate selection signals and other commands. These switches and signals are well known and, as is also well known, the user moves mouse 110 along a planar surface, such as a table top, to generate cursor position input commands which are supplied to processor 102. The roller ball cooperates with a mechanism which converts the movement of the mouse 110 into X-Y signals which are used by the processor 102 to control positioning of the cursor symbol on display screen 122 of display 120.

The conversion of the motion of the roller ball into x-y commands is also conventional.

Keyboard 115 may replace the activities of mouse 110 by presetting a number of keys on the keyboard to emulate the positioning function of mouse 110. Additionally, other keys on the keyboard 115 may replace the functions of the buttons of mouse 110. However, in the preferred implementation of the present invention, mouse 110 is used for positioning the cursor on the display screen 122 and for performing other functions described below. As is generally the case with conventional data processing systems, keyboard 115 of workstation 100 acts as a means of inputting textual or alphanumeric information into processor 102. As stated above, display 120 is comprised of display screen 122 for displaying the graphic and alphanumeric information output from processor 102. In the workstation 100, display 120 may be a touch-screen display in which commands may be entered into processor 102 via the display 120. Such touch-screen displays are also conventional.

Finally, in the preferred implementation of the present invention other external devices may be connected to workstation 100 to, for example, permit users to scan input information into workstation 100 with a digital scanning device or to print reports generated by the preferred implementation using an optional printer. These devices are also conventional.

Major Components of the Preferred Implementation

The preferred implementation of the present invention is comprised of several software components, collectively designated NetworkVUE™ 200 (FIG. 2), which would reside in the disk drive 105 (FIG. 1). When the user employs NetworkVUE™ 200, all or part of NetworkVUE™ 200 may be input to processor 102.

Figure 2:
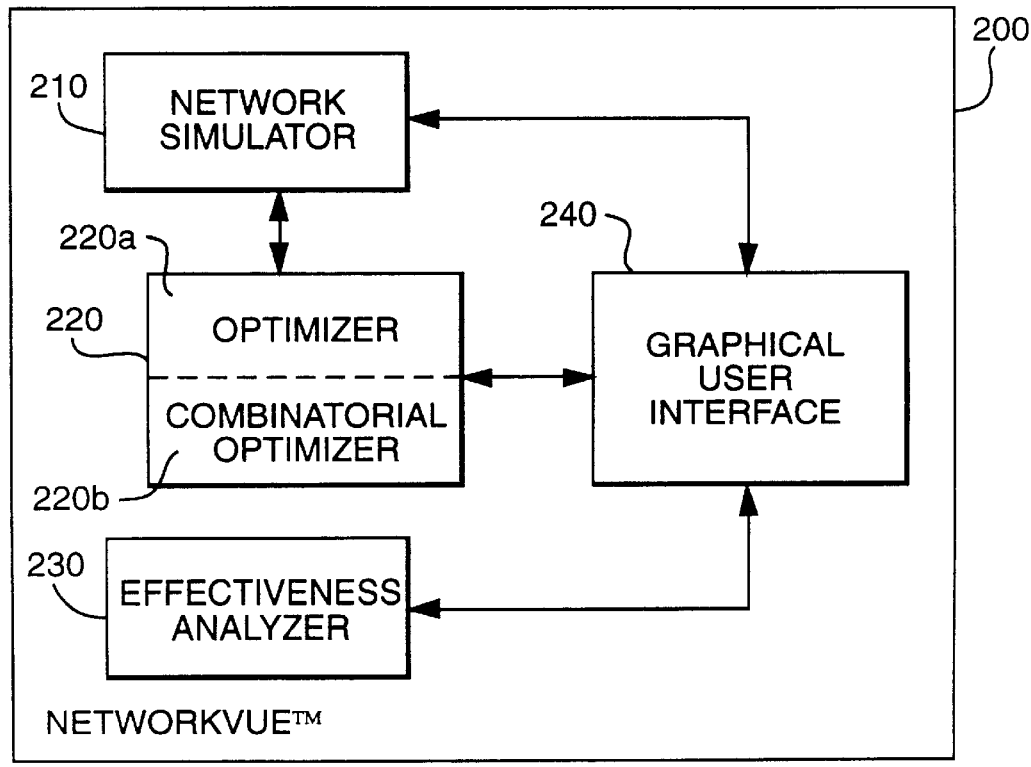
FIG. 2 is a block diagram of software components according to the preferred implementation of the present invention.

FIG. 2 is a block diagram which illustrates the components of NetworkVUE™ 200. NetworkVUE™ 200 is comprised of a network simulator 210, an optimizer/combinatorial optimizer 220 (optimizer 220a and combinatorial optimizer 220b), and an effectiveness analyzer 230, connected to a graphical user interface 240.

NetworkVUE™ 200 is a window-based application with display screen 122 divided into several windows, each of which has its own boundaries and contains a different portion of the data currently being processed by NetworkVUE™ 200. Each window also contains its own menu or other controls, and the user can manipulate the size of each window as well as select from any of the options specified in the menus. When NetworkVUE™ 200 is invoked (i.e., begins execution) in workstation 100, graphical user interface 240 is the initializing component that provides windows generated on display screen 122 of display 120. The windows of graphical user interface 240 are the "canvas" on which the user creates simulations of a network based on (1) a specific network configuration and (2) defined traffic conditions.

The configuration of a network includes information on the location of sites (e.g., nodes) in the network and links connecting the sites (i.e., connectivity), as well as the hardware used at each site and for each link. The traffic conditions of the network, also called a "scenario," include information on the type and size of transmissions in the network along with the time when the transmissions occur and the source and destination sites for each transmission. (From the network configuration and traffic conditions, network simulator 210 generates a simulation, including the performance and cost of operating the network under the defined traffic conditions.)

The user also inputs, via graphical user interface 240, preference data related to qualitative concerns that the user may have with regard to operation of the network. Preference data includes whether a network operator would like to down-size its network; decrease costs of using, operating, or maintaining the network; update network equipment; minimize transmission delays; minimize the number of messages lost during transmission; maximize network utilization at all times; minimize network changes but satisfy other preferences and/or performance requirements; and make sure that state-of-the-art equipment is employed in the network.

Network simulator 210 is initiated by the user using graphical user interface 240 to generate a network simulation from the specific network configuration and defined traffic conditions. A network simulation, called a base-line simulation, includes data related to effectiveness (performance and cost) of operation of the network under the defined traffic conditions. This data is referred to as quantitative data on network operation. Further details on the types of quantitative data will be described below.

Graphical user interface 240 also permits the user to initiate execution of optimizer/combinatorial optimizer 220. Optimizer/combinatorial optimizer 220 uses a base-line simulation (including quantitative data) generated by network simulator 210 along with preference data from the user (obtained via graphical user interface 240) to select and evaluate various options and combinations of options for modifying the network. These options and combinations of options must satisfy requirements set by both the quantitative and preference data.

The network configuration may then be modified (if necessary) according to each of the selected options and combinations of options. Network simulator 210 can then generate new network simulations for each modified network configuration (along with the traffic condition information). Either the user may initiate network simulator 210 for this purpose using graphical user interface 240 or optimizer/combinatorial optimizer 220 may initiate network simulator 210 immediately after selecting the various options and combinations of options for modifying the network. The user can choose either of these methods for initiating network simulator 210.

The user initiates effectiveness analyzer 230 using graphical user interface 240. Effectiveness analyzer 230 compares a base-line simulation with network simulations generated by network simulator 210 for each modified network configuration. Based on differences between the base-line simulation and the network simulations generated by network simulator 210 for each modified network configuration, effectiveness analyzer 230 ranks the modified network configurations.

Simulation Optimization Procedure

Figure 3:
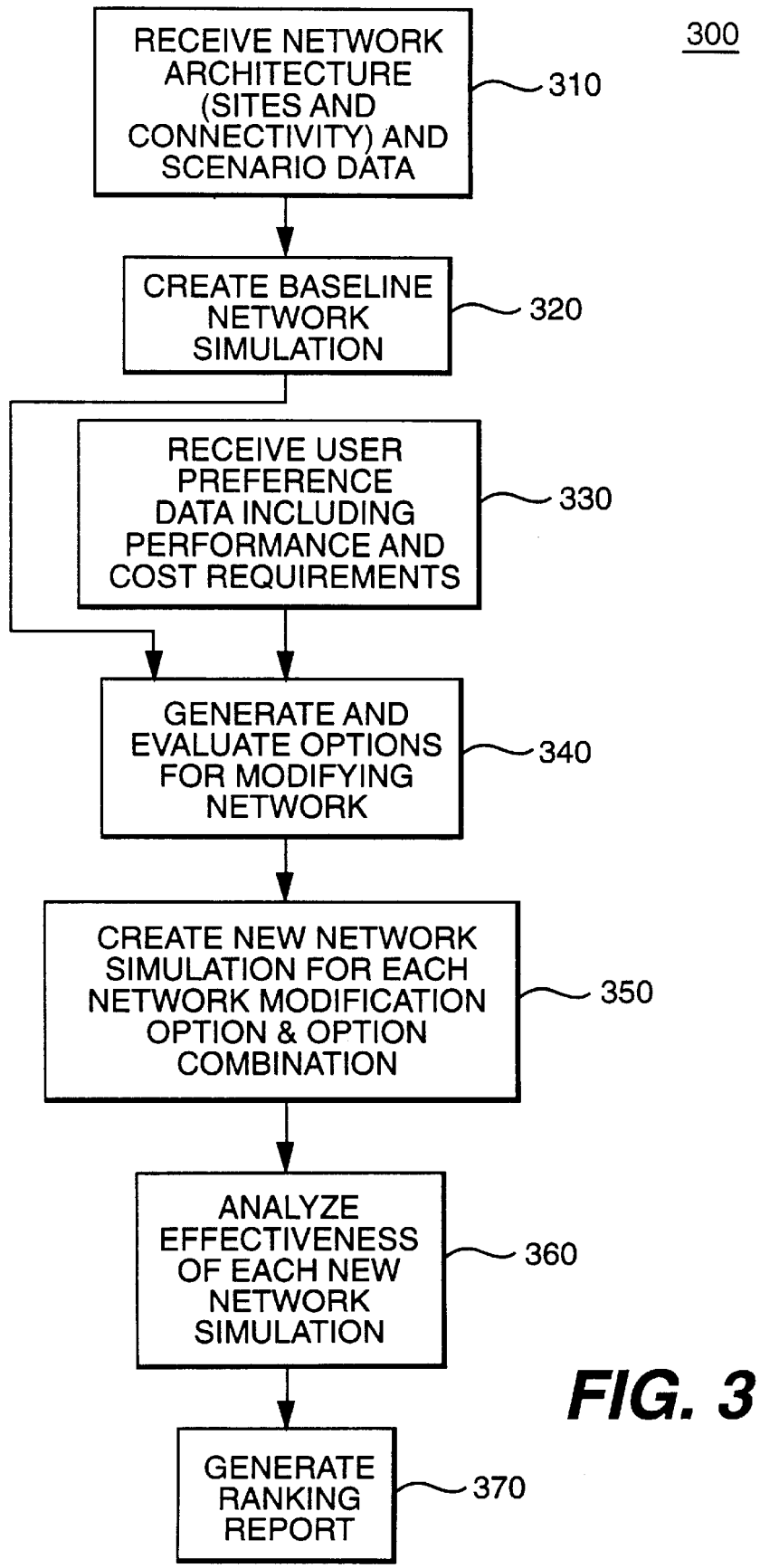
FIG. 3 is a flow chart of a general procedure for optimizing a network architecture simulation according to the preferred implementation of the present invention.

FIG. 3 is a flow chart of the general procedure 300 used by the preferred implementation of the present invention to optimize a network architecture simulation by identifying and ranking options and combinations of options for altering a base-line network architecture simulation according to data on performance of the network architecture under defined traffic conditions and selected user preferences for maintaining, using, or altering the network architecture. In response to input from a user, NetworkVUE™ 200 receives a network architecture, including the sites (or nodes) of the network and connectivity (or links) between the sites (step 310). The user also provides details on the type and make of hardware equipment for each site and connection as well as the identity of all providers of global telecommunications network services, i.e., service providers.

NetworkVUE™ 200 also receives from the user scenario data on traffic conditions in the network during a given period, for example, one hour, one day, one week, or one month (step 310). This scenario data describes a specific scenario for communications through the network.

Figure 4:
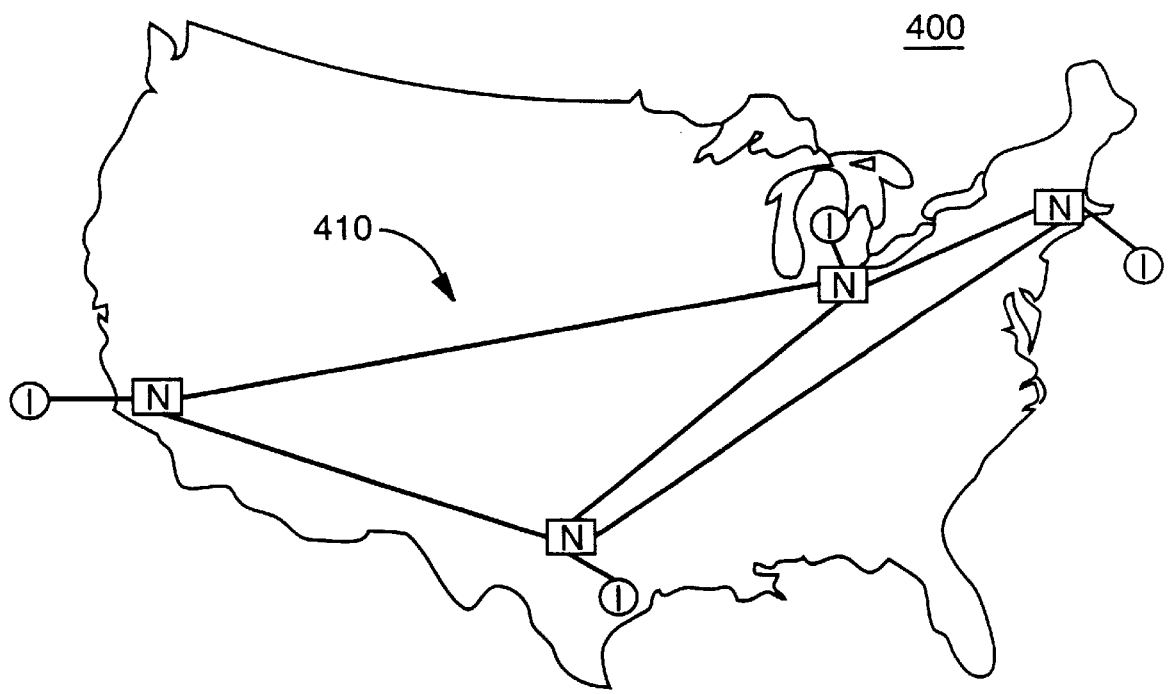
FIG. 4 is an exemplary map for entering a network architecture to be simulated according to the preferred implementation of the present invention.

For example, using graphical user interface 240, a user can select a map of an area for an existing or proposed network architecture. FIG. 4 illustrates a map 400 of a portion of the United States of America that is similar to a map that users may select using graphical user interface 240. Graphical user interface 240 also provides maps of other areas as well as unspecified maps for network architectures that do not correspond to physical locations on a map of an area of the United States of America or another country, for example, network architectures in a single office space.

Included in the map 400 in FIG. 4 is an exemplary network architecture 410. The network architecture 410 includes a plurality of nodes N and global network connections I located at various locations on the map 400 and connected by links. The global network connections I represent connections to public telecommunication service providers such as AT&T, MCI, or the Internet. Each node N, global network connection I, and link is comprised of computer and/or telecommunications hardware, for example, computers, switches, routers, mixers, and fiber optic cables. The user provides details on the hardware equipment for each node N, global network connection I, and link. These details include manufacturer and model number of all equipment used in the actual or proposed network.

The nodes N represent principle operating sites (POPS) of the network architecture 410 and the global network connections I represent connections between the network architecture 410 and other networks (not shown) of public telecommunication service providers such as AT&T, MCI, etc. The links between the nodes N and between nodes N and global network connections I represent communication lines such as copper or fiber optic cables used to transmit data and/or voice between the nodes N and between nodes N and global network connections I.

One skilled in the art will recognize that standard techniques may be used to select locations on a displayed map for the placement of nodes N, global network connections I, and links. One such technique employed in graphical user interface 240 uses a "point and click" approach. In this approach, users manipulate the location a pointer displayed on display screen 122 by moving mouse 110. By depressing a mouse button at a location on the display screen 122 corresponding to a selected icon for a type of network location (e.g., node or global network connection), users can include that type of network location in a displayed network configuration by "dragging" the icon for a selected type of network location to a location on a displayed map. Graphical user interface 240 may then prompt users for information on characteristics of the network hardware such as the manufacturer and model number of the hardware associated with the network location. Links between nodes N and between nodes N and global network connections I are made using graphical user interface 240 to select an icon for a node N or global network connection I in a displayed map, depressing a mouse button when the pointer (being manipulated by the mouse) is on the selected icon, dragging a line from the selected icon to a second icon for a node N or global network connection I on the displayed map, and releasing the mouse button. In the case of links between nodes N and between nodes N and global network connections I, graphical user interface 240 may also prompt users for information on hardware used in the links and link capacity. Capacity is a measure of how much data, voice, and other types of transmissions may simultaneously use the link.

Figure 5:
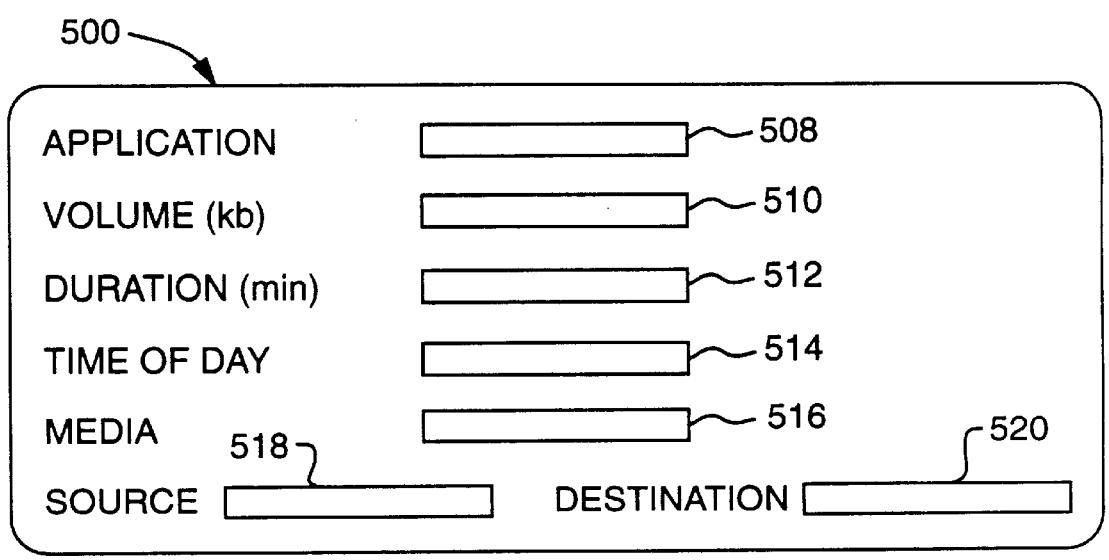
FIG. 5 is an exemplary window for entry of data on a scenario for a network architecture simulation according to the preferred implementation of the present invention.

The user also provides scenario data on traffic conditions, i.e., conditions related to communications in a network during a given time period. To enter scenario data, for example, the user directs mouse 110 in such a manner to point to a defined area of display screen 122 and selects an appropriate displayed icon or menu option by depressing a mouse button. Graphical user interface 240 then displays a window, such as window 500 shown in FIG. 5, for the user to enter scenario data using a keyboard or other input device.

Using, for example, mouse 110 or other pointing device, the user can place a cursor in any of the data entry boxes 508, 510, 512, 514, 516, 518, and 520 and enter data (application type, volume, duration, time of day, media, source and destination) for a given data transmission in a scenario.

Data entry box 508 permits the user to associate data transmissions with specific applications (operations or functions) of the user's company. For example, the user's company may have various departments, for example, finance, marketing and sales, and management, that require services of the network. But some departments may receive preferential treatment on the network. For example, if the finance department needs to transmit data on a specific network link(s) at a given time, and that transmission is requested while the marketing and sales department is currently transmitting voice along the same network link(s), the marketing and sales department may be given precedence over the finance department's data transmission. This would mean that the finance department may have to wait until the sales and marketing completes the voice transmission before finance may transmit data. Alternatively, another route (i.e., network link(s)) may have to be located for data transmission for the finance department.

In data entry box 510, the user enters (using a keyboard or other input device) the volume (in kilobytes for example) of data to be transmitted over the link at a specific time. In data entry box 512, the user enters the duration (in minutes for example) of a data transmission, and in entry box 514, the user provides the time of day when the data transmission is to begin. In entry box 516, the user provides the type of media (data, voice, facsimile, etc.) involved in a transmission. Entry box 518 is for the source of a transmission, and entry box 520 is for the destination. The source or destination may be one of the nodes N specified in the network architecture. All this information describes an "event" of a scenario.

One skilled in the art will recognize that various techniques may be used to make graphical user interface 240 extremely "user friendly." One way would be to provide pull down menus for users to select from various options for each of the entry boxes 508–520.

FIG. 6 is a table showing an example of scenario data 600. As illustrated, scenario data 600 includes information on an application requiring a network transmission, a source and destination for the network transmission, type of media involved in the transmission, the amount or volume involved in the transmission (measured in megabytes), the time of day for the transmission, and the data rate (in millions of bits per second or Mbps). (The data rate is calculated using the volume and duration of a transmission.)

For example, the first entry 610 in the scenario data 600 specifies a data transmission requirement for the finance department for 150 megabytes of data from New York to Dallas at the time 16:15. At 8 bits in one byte and a transmission duration of 57.1 minutes, the data rate is 0.35 Mbps.

Returning to FIG. 3, network simulator 210 creates a base-line network simulation from scenario data and a network architecture (step 320). This includes information on all data transmissions occurring in the network during a given interval. The base-line network simulation includes three categories of information: scenario assessment, architecture assessment, and cost assessment. The scenario assessment generally provides information on how well the network architecture performs under given scenario data. In the preferred implementation, functions of "MYCOM," a computer communications modeling tool commercially available from GRC, International, Inc., are used to provide scenario assessment information. MYCOM is described in "MYCOM COMPUTER COMMUNICATIONS MODEL," G. Thompson, July 1989, General Research Corp. The architecture assessment provides information concerning equipment reliability, i.e., how the equipment is likely to perform under the scenario data given the type and quality of equipment. This information is gathered from statistical information from manufacturers and users of network equipment, which information is previously stored in a hardware database. Finally, the cost assessment provides information on the costs involved in setting up and maintaining the network architecture as well as the costs associated with the transmissions specified in the scenario data. This information is gathered from the hardware database as well as a second tariff database, which includes transmission cost information.

After network simulator 240 creates a base-line simulation (step 320), optimizer/combinatorial optimizer 220 receives the user preference data including user performance and cost requirements (step 330), and generates and evaluates options for modifying the network architecture in accordance with the user preference data (step 340). Optimizer/combinatorial optimizer 220 also selects options to combine with other options, forming combinations of options for modifying the network architecture, and evaluates those combinations of options in accordance with the user preference data (step 340).

The network simulator 210 generates new network simulations for each selected option and combination of options for modifying the network architecture (step 350). Effectiveness analyzer 230 compares the base-line simulation for the original network architecture with the network simulations for each selected option and combination of options for modifying the network architecture (step 360). Effectiveness analyzer 230 generates a ranking report (step 370) in which each option and combination of options for modifying the network architecture is ranked in accordance with the user preferences.

General Operation

Figure 7:
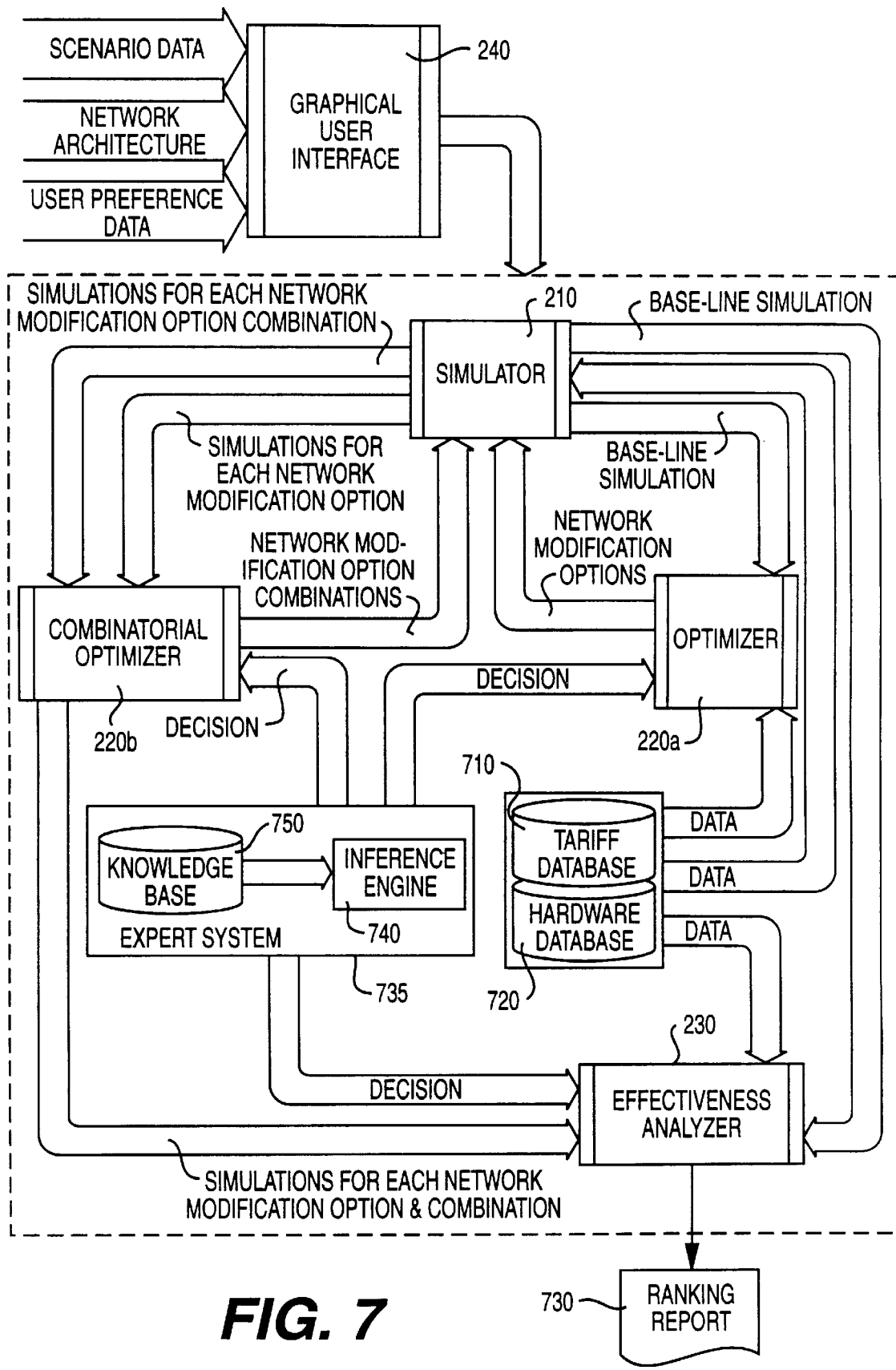
FIG. 7 is a block diagram of an automated network simulation and optimization system according to the preferred implementation of the present invention.

FIG. 7 is an operational flow diagram according to the preferred implementation of the present invention. As shown, graphical user interface 240 receives from a user scenario data, a network architecture, and user preference data. (One skilled in the art will recognize that users may prefer to provide scenario data, network architecture, and user preference data by identifying a file or files in which this information was previously stored.) Users may use graphical user interface 240 to initiate the procedure 300 explained above with reference to FIGS. 3–6.

Simulator 210 uses scenario data and data on a network architecture to generate a simulation. As explained above, the simulation produces performance data, including scenario assessment data (i.e., how well the network architecture performs under given scenario data), architecture assessment data (i.e., equipment reliability and availability), and cost assessment data (i.e., costs involved in setting up and maintaining the network architecture, and costs associated with the transmissions specified in the scenario data). To generate this assessment data, simulator 210 uses data previously stored in tariff database 710 and hardware database 720. Tariff database 710 includes information on costs associated with all types of transmissions, for example, cost of transmitting data from one site to another site using a third-party's network. Hardware database 720 includes information on network equipment such as manufacturer and cost data, as well as statistical data on the equipment such as reliability data on how reliable the equipment has been in the past and performance data on how well the equipment performs in general.

The simulation, i.e., base-line simulation, is provided to optimizer 220a along with data from tariff database 710 and hardware database 720. Optimizer 220a generates network modification options for modifying the network architecture according to user preference data and scenario assessment data, architecture assessment data, and cost assessment data from the base-line simulation. Optimizer 220a also uses information previously stored in tariff database 710 and hardware database 720 to identify network modification options. For example, optimizer 220a may determine that equipment at a particular site should be changed in order to meet the user's preferences. To identify alternative equipment, optimizer 220a accesses equipment information stored in hardware database 720.

To generate the network modification options, optimizer 220a queries expert system 735 for decisions on: (1) whether types (or categories) of network modification options should be considered to address performance issues specified in the performance data of a base-line simulation (e.g., areas in which performance of the network architecture was not satisfactory under the scenario) and user preference data, and (2) whether specific network modification options address the performance issues and user preference data.

Expert system 735 includes a knowledge base 750 and an inference engine 740. Knowledge base 750 includes knowledge of experts in networking in the form of a rule-base consisting of a plurality of IF-THEN rules. These rules represent conditions (in the IF part of a rule) that experts consider in making determinations about modifying network architectures analyzing both performance issues (raised by the scenario assessment, architecture assessment, and cost assessment) and user preference data. Inference engine 740 generally applies performance data from a simulation and user preference data to sets of rules in knowledge base 750 to provide optimizer 220a responses to queries (1) and (2).

Selected network modification options, for example, the ten best options, are then provided to network simulator 210, which generates simulations for each network modification option (based on the base-line simulation for the original network architecture). The simulation for each network modification option is then provided to combinatorial optimizer 220b, which generates combinations of network modification options for modifying the network architecture according to user preference data and performance data, i.e., scenario assessment data, architecture assessment data, and cost assessment data, for simulations for each network modification option. In generating the combinations of network modification options, combinatorial optimizer 220b also queries expert system 735 for a determination on whether specific combinations of modification options meet conditions of the user preference data. To make this determination, inference engine 740 selects an appropriate set of rules from knowledge base 750 corresponding to the combination of modification options to be considered, and applies the selected set of rules using the user preference data. Inference engine 740 then provides combinatorial optimizer 220b a responsive decision on whether a combination of modification options meets requirements of the user preference data.

Selected combinations of network modification options, for example, the hundred best combinations, are then provided to network simulator 210, which generates simulations for each selected combination of network modification options (based on the original base-line simulation for the original network architecture). Combinatorial optimizer 220b provides the simulations for the network modification options (selected by optimizer 220a) as well as selected combinations of network modification options (selected by combinatorial optimizer 220b) to effectiveness analyzer 230.

Effectiveness analyzer 230 compares the base-line simulation against the simulations for the network modification options and against the simulations for combinations of network modification options. Scenario assessment data, architecture assessment data, and cost assessment data for the simulations are compared along with user preference data. Using the user preference data, effectiveness analyzer 230 orders the network modification options and combinations of network modification options. One order may be by rank with the best overall simulation (in terms of scenario assessment data, architecture assessment data, and cost assessment data as limited by user preference data) ranking the highest.

In ranking the modification options and combinations of modification options, effectiveness analyzer 230 also queries expert system 735 for a ranking (e.g., very high, high, moderate, low, very low) for each modification option and combination of modification options. To make this ranking, inference engine 740 selects an appropriate set of rules from knowledge base 750 (combinatorial rule set) and applies that set of rules to the simulation for each modification option in a combination considering user preference data as well. Application of the rule set provides a ranking for the option or combination, which ranking the inference engine 740 provides in the form of a decision on each option or combination to effectiveness analyzer 230.

Effectiveness analyzer 230 generates a ranking report with information on the ranking of the network modification options and combinations of network modification options along with a rationale behind the rank of each option or combination of options. This rationale includes information on the steps taken by NetworkVUE™ 200 to rank the option or combination.

Simulation Procedure

Figure 8:
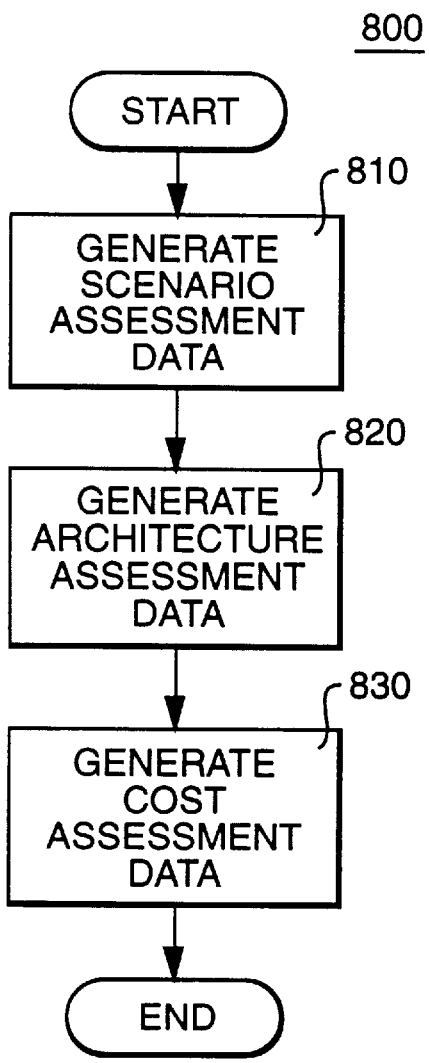
FIG. 8 is a flow chart of a simulation procedure performed by a simulator according to the preferred implementation of the present invention.

FIG. 8 is a flow chart of the simulation procedure 800 performed by simulator 210 to generate a simulation. The procedure 800 consists of three steps: (1) generate scenario assessment data (step 810); (2) generate architecture assessment data (step 820); and generate cost assessment data (step 830). Simulator 210 may perform these steps in any order, not just the order specified in FIG. 8.

The scenario assessment data indicates how well the network architecture performs under given scenario data. The scenario assessment data comprises:

(1) throughput: the realized transfer rate on a link at any one time.

(2) utilization: percentage of time a link is occupied with a transmission.

(3) delays: how much time it takes for a transmission between the source and destination.

(4) response time: the round-trip delay (transmission delay from source to destination and back to source).

(5) collisions: transmissions that require a link at the same time (how many links are involved and which links).

(6) queuing problems: how often transmission speed (on a link) or processing speed (at a node) is not adequate.

(7) re-transmissions: how many time transmissions are resent due to failures to receive acknowledgments. (Destination sites acknowledge receipt of transmissions.)

(8) lost transmissions: how many times transmissions are lost due to excessive loading on network equipment.

(9) blocked transmission: how many times transmissions are blocked due to excessive loading on network equipment where connections for the transmission cannot be established.

The architecture assessment data indicates equipment reliability based on statistical information from manufacturers and users of equipment. The statistical information is stored in hardware database 720. The architecture assessment data comprises:

(1) mean time before failure (MTBF): how much time generally passes between failures of a given piece of equipment employed in the network being simulated.

(2) error rate: how often the equipment causes errors in transmission.

(3) availability: the aggregate of the MTBF for the equipment in the network factoring in equipment downtime.

The cost assessment data indicates costs for setting up and maintaining the network architecture. Costs assessment data also indicates costs associated with the transmissions specified in the scenario data. Simulator 210 uses information in tariff database 710 as well as hardware database 720 to generate cost assessment data. For example, hardware database 720 includes costs of hardware used in the network architecture and tariff database 710 includes information on the cost of transmissions using a third-party's network (e.g., via a global network connection). The cost assessment data comprises:

(1) equipment costs: initial costs to purchase equipment.

(2) equipment life-cycle costs: costs for maintaining equipment over the lifetime of the equipment.

(3) network management costs: overhead cost to manage network given the equipment that is included in the network architecture.

(4) tariff costs: costs for transmissions in the scenario data. Scenario assessment data, architecture assessment data, and cost assessment data constitute a part of the simulation created by simulator 210. Simulator 210 generates a simulation for a network architecture provided by the user. Simulator 210 also generates simulations for the network architecture from the user as modified in accordance with options selected by optimizer 220a and combinations of options selected by combinatorial optimizer 220b.

Optimization Procedure

Figure 9:
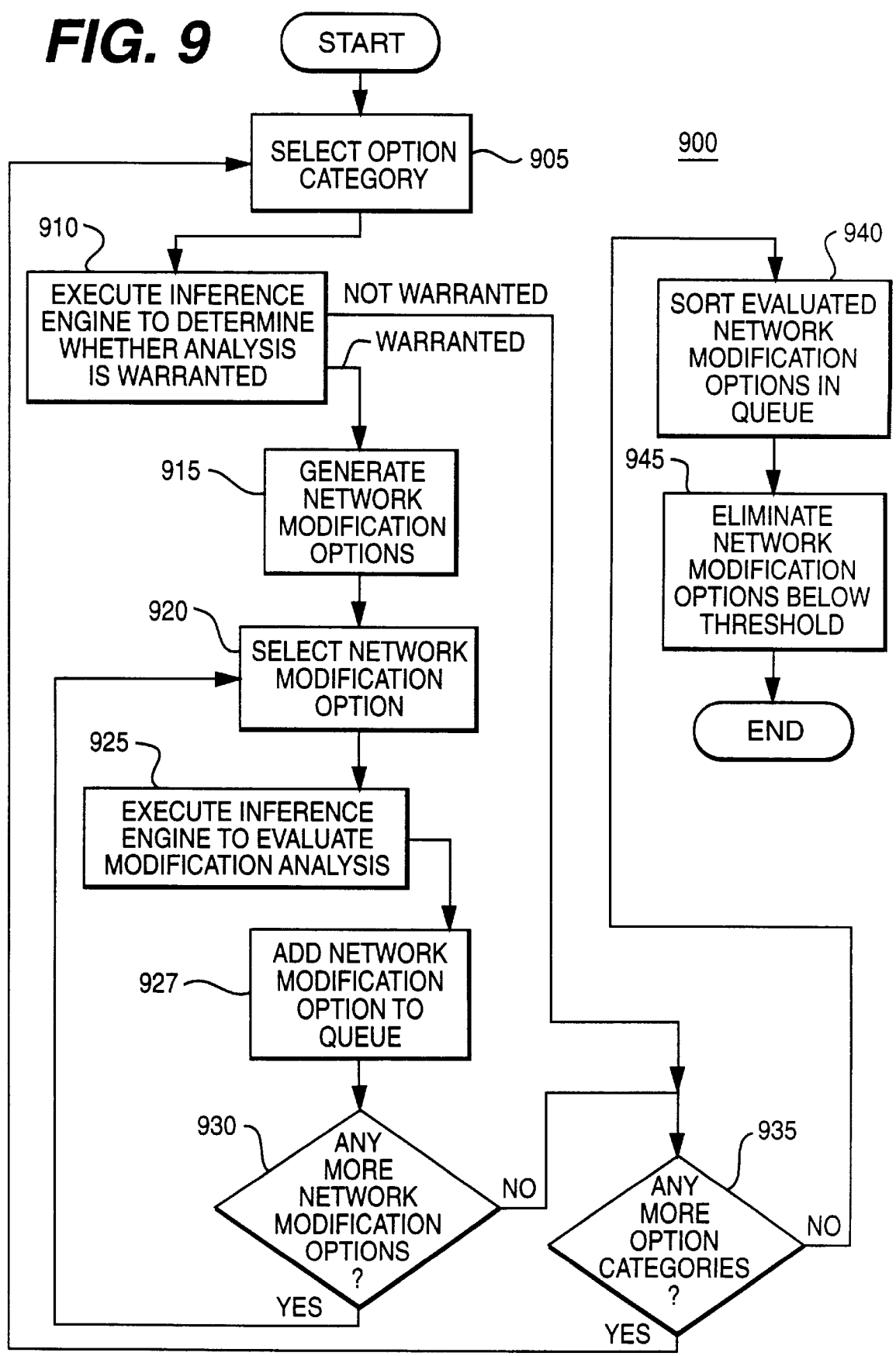
FIG. 9 is a flow chart of an optimizing procedure performed by an optimizer according to the preferred implementation of the present invention.

FIG. 9 is a flow chart of the optimizing procedure 900 performed by optimizer 220a to generate network modification options for modifying a simulation of a network architecture in accordance with user preference data. User preference data includes information on the user's criteria or requirements for changing the network architecture. For example, a user may have a preference for improving performance while providing for down-sizing. In this case, the user would provide appropriate responses to queries from graphical user interface 240.

Graphical user interface 240 provides a set of queries to be answered by a user, which answers define user preference data. The queries include:

(a) What is (are) your highest priority for changing the network architecture?

(b) What is (are) your lowest priority for changing the network architecture?

In response to (a) and (b), the user would select one of the following factors: improving performance, lowering costs, improving availability, providing for growth in the network, minimizing network changes (due to risk), providing for down-sizing, and accommodating external business decisions.

Improving performance can mean increasing the throughput of messages between any two nodes in the network, decreasing the response time (e.g., a request and corresponding reply) between two nodes, decreasing the queuing of messages that may result when circuits are overloaded, or reducing the amount of message data that may get lost during transmission. Lower costs means something different to a network provider and a network user. A network provider may want to lower costs by reducing redundancy or buying more reliable equipment. However, a network user may want to lower costs by changing to service providers that provide lower tariff rates. Improving availability refers to maximizing the operating time of network equipment and links. Raising the MTBF (mean time before failure) and lowering the MTTR (mean time to repair) of equipment used are two ways of increasing the network availability. Accommodating external business decisions is a general factor used to capture conditions not otherwise specified as a user preference. For example, a user may want to remove a network node because of a plan to close a data processing center at the node. The closure is not due to any network utilization problems (i.e., problems found in the performance data), but because it has been determined that the data processing center is no longer needed.

The user's responses to (a) and (b) would define a portion of user preference data. Graphical user interface 240 may also prompt the user for answers to other questions specifying performance and cost requirements, which define conditions for optimizing the network performance. The scope and type of questions is only limited by the categories of modification options to be evaluated.

Responses to the queries may be applied to several categories of options for modifying the network. In the preferred implementation, the option categories are:

(1) adding a link to the network;

(2) removing a link from the network;

(3) adding a site to the network;

(4) removing a site from the network;

(5) changing the location of a site;

(6) increasing the data rate;

(7) decreasing the data rate;

(8) changing technologies;

(9) changing equipment;

(10) changing from public to private network service;

(11) changing from private to public network service; and

(12) changing vendors.

Changing technologies refers to using different protocols on the network. For example, it may be desirable to change from ISDN to B-ISDN. Changing equipment refers to replacing communications equipment (e.g., routers, switches, etc.). Changing from public to private network service means changing from using a service provider to building your own network and providing your communications services in-house. Changing from private to public network service is just the opposite. Changing service providers means using a different communications provider (e.g., AT&T, MCI, Sprint, etc.) for service between nodes. Those skilled in the art will recognize additional categories may be added within the scope of the present invention.

For example, in determining whether to consider adding a link to network architecture being simulated, optimizer 220a would review the user's preference data (e.g., responses to questions (a) and (b) above). For the adding a link category, answers to other questions may be relevant as well. For example, graphical user interface 240 may ask for information on the expected type(s) of transmissions to be sent on an added link. The answer to this question may factor into what type of hardware should be selected for a new link if optimizer 220a (based on a decision from inference engine 740) determines that evaluation of the adding a link option is warranted. Optimizer 220a would also check the simulation, namely, the scenario assessment data, architecture assessment data, and cost assessment data, for indications of problems in the network simulation, for example, inadequate throughput, excessive delays, cost effectiveness, excessive lost messages, low availability, and high or low utilization. Determination of whether or not some factor is excessive, high, or low is accomplished by reviewing the user preference data. If the user preference data and simulation indicate that, in this example, adding a link should be considered, optimizer 220a generates and evaluates modification options corresponding to adding a link.

Referring to FIG. 9, optimizer 220a first selects an option category (step 905). Optimizer 220a then executes inference engine 740 for a determination on whether the user preference data indicates that analysis of the network modification option corresponding to the selected option category is warranted (step 910). If consideration of a category is warranted, optimizer 220a generates network modification options in accordance with the selected option category (step 915).

Figure 12:
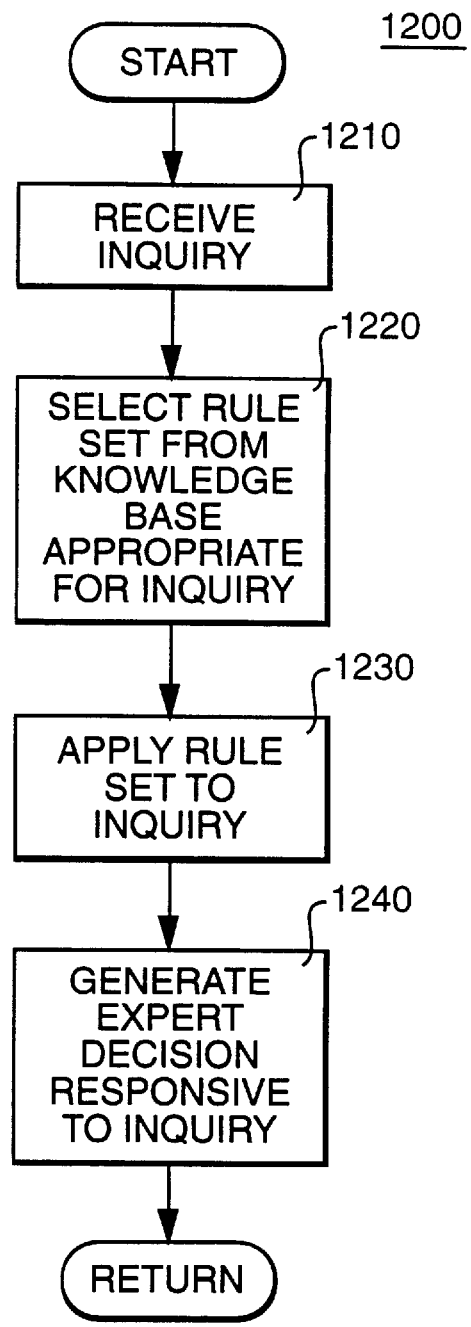
FIG. 12 is a flowchart of an inference engine according to the preferred implementation of the present invention.

To determine whether consideration of options corresponding to an option category is warranted, inference engine 740 follows the inference engine procedure 1200 shown in FIG. 12. First, inference engine 740 receives the inquiry for a determination from the optimizer 220a (step 1210). Inference engine 740 then selects from knowledge base 750 a rule set for the inquiry (e.g., rules for determining whether consideration of an option category is warranted) (step 1220). The selected rule set is then applied to the inquiry (step 1230) so inference engine 740 can generate a decision (i.e., warranted or not warranted) responsive to the inquiry (step 1240).

The following is an example of a rule applied by inference engine 740 to provide optimizer 220a with a determination of whether consideration of adding links (a category) to the network architecture is warranted:

IF the scenario assessment data of the base-line simulation is below the user performance requirement and the cost assessment data of the base-line simulation is below the user cost requirements and the highest user priority is improving performance and the lowest user priority is lower costs and the media type for adding a link is voice THEN consideration of adding a link is (100%) warranted.

Returning to FIG. 9, optimizer 220a then queries the tariff database 710 and/or hardware database 720 for available information on tariffs and hardware for specific network modification options corresponding to the option category. For example, optimizer 220a may determine that user preference data and the simulation indicates that the evaluation of modification options for the adding a link option category is warranted. Under these circumstances, optimizer 220a would generate all appropriate options for modifying the network architecture in accordance with the adding a link option category. The modification options may include adding links between all sites that require additional capacity for data transmission in accordance with the simulation. The link options may also vary based on the types of links available (e.g. manufacturer, cost, and capacity). Thus, optimizer 220a queries hardware database 720 for information on available types of links.

After the network modification options are generated (step 915), optimizer 220a selects one of the network modification options (step 920) for evaluation (step 925). Step 925 also uses the inference engine procedure 1200 described above with reference to FIG. 12. As applied to step 925, the inference engine 740 selects a rule set from knowledge base 750 corresponding to a modification option being evaluated (step 1220); applies the selected rule set to (1) the scenario assessment data, architecture assessment data, and cost assessment data of the base-line simulation, and (2) user preference data (step 1230); and generates the expert decision on the value of the modification option (e.g., very high, high, moderate, low, very low) (step 1240).

The following is an example of a rule applied by inference engine 740 to provide optimizer 220a with a determination on the value of adding a link between the specific nodes (e.g., nodes A and B) specified in a network modification option:

IF the highest user priority is improving throughput and the lowest user priority is providing for down-sizing and the expected media type over the link is voice and the anticipated improvement for adding the link is increasing throughput and the anticipated downside for adding the link is none THEN the value of adding a link between sites A and B is very high.

In this example, inference engine 740 considers the anticipated improvement and down-side of the modification option. These anticipated results are based on information on the performance of the modification option (e.g., the new link) from the hardware database. The rule gives a valuation of the modification option for adding a link between nodes A and B.

In the adding a link example discussed above, optimizer 220a may determine that certain link modification options are not appropriate (e.g., valued at very low) because user preference data indicates the user does not wish to spend significant funds in modifying the network architecture. Thus, link modification options that are high cost will be eliminated when they are evaluated (step 925) because those options fail to satisfy user preference data.

Network modification options that survive the evaluation (step 925) are added to a queue of potential network modification options (step 927), which will be evaluated further by optimizer 220a.

After it evaluates a network modification option (step 925), optimizer 220a determines whether there are any other network modification options for the present category (e.g., adding a link between San Francisco and Denver, adding a link between Seattle and Los Angeles) to be evaluated (step 930). If so, then optimizer 220a selects another network modification option within the same category for evaluation (step 920). Otherwise there are no more options for that category and optimizer 220a determines whether there are any other categories of potential modification options to be considered (step 935). If yes, then optimizer 220a selects another category (step 905) and processing continues through steps 910–930 for that new category.

If all categories of options have been considered (step 935), then optimizer 220a sorts the network modification options placed in the queue of potential network modification options (step 940). This sort places at the top of the queue the network modification options that most closely satisfy all user preference data (valued at very high by inference engine 740) and are likely to address all of the problems noted in the scenario assessment data, architecture assessment data, and cost assessment data of a base-line simulation. This sorting is based on the value of each modification option as determined by inference engine 740 in step 925.

Optimizer 220a then determines which of the network modification options in the queue are above a predetermined threshold level. For example, the queue may have hundreds of options and optimizer 220a identifies only the top 20 options for further processing by combinatorial optimizer 220b.

Combinatorial Optimizing Procedure

Figure 10:
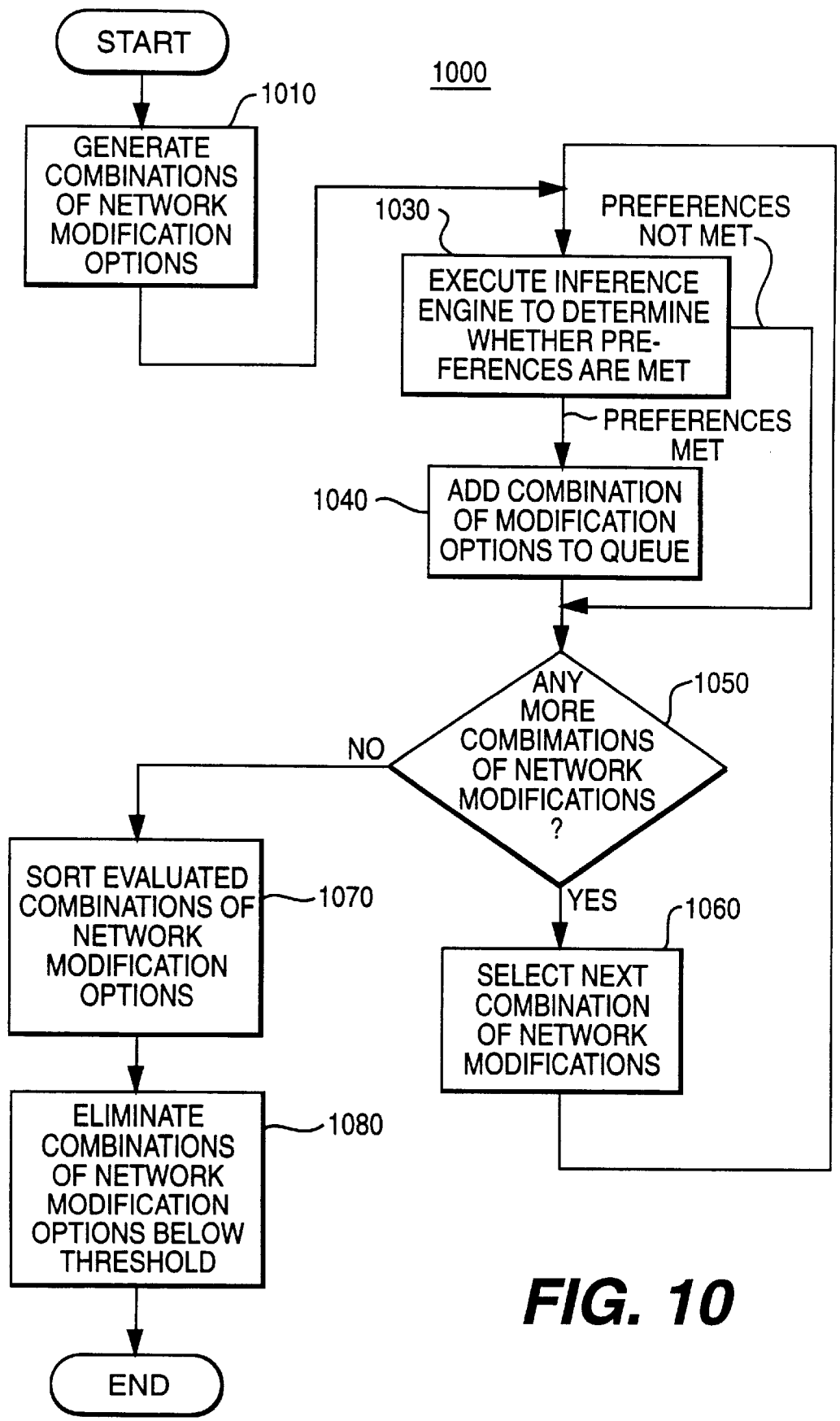
FIG. 10 is a flow chart of a combinatorial optimizing procedure performed by a combinatorial optimizer according to the preferred implementation of the present invention.

FIG. 10 is a flow chart of the combinatorial optimizing procedure 1000 performed by combinatorial optimizer 220b to generate combinations of network modification options for modifying a simulation of a network architecture in accordance with user preference data. In general, combinatorial optimizer 220b generates combinations of the network modification options based on the simulations produced for each option left in the network modification options queue after optimizer 220a performs the threshold analysis in step 945 (FIG. 9).

Combinatorial optimizer 220b first generates the combinations of network modification options from the network modification options in the option queue (step 1010). There is a combination option for every group of two modification options, for every group of three modification options, and so on until the number of combinations exceeds a predetermined threshold.

Combinatorial optimizer 220b then examines the combination options to determine which combination options may be eliminated because they do not satisfy user preference data (step 1030). For example, combinatorial optimizer 220b may determine that a combination option that includes two options for changing the same link between the same two sites in the network or adding more than one link between two sites does not make sense. In either of these cases, the combination would be eliminated from further consideration.

Combinatorial optimizer 220b uses inference engine 740 to determine whether a combination of options meet user preference data. In a manner similar to that described above with respect to step 925 of optimizing procedure 900, inference engine 740 receives an inquiry, i.e., a combination option, from combinatorial optimizer 220b (step 1210 of FIG. 12). The inference engine 740 selects from the knowledge base 750 a rule set for the combination option from combinatorial optimizer 220b (step 1220) and applies the rule set to the combination option (step 1230). Inference engine 740 then generates an expert decision as to whether the combination option satisfies the user preference data (step 1240) and provides that decision to combinatorial optimizer 220b.

The following is an example of a rule applied by inference engine 740 to determine whether a combination option including option 1, which specifies adding a link, and option 2, which specifies removing a link, meet user preference data:

IF option1 is adding a link and the highest user priority is improving throughput and the change in throughput for option1 is positive and option2 is removing a link and the change in throughput for option2 is negative THEN this combination option does not meet the user preference data.

In this example, inference engine 740 examines the options (option 1 and option 2) in light of user preference data to determine whether the combination of those two options satisfies user preference data. The change in throughput for option 1 is positive if there is an increase between the throughput of the base-line simulation and the throughput of the simulation for option 1. Similarly, the change in throughput for option 2 is negative if there is a decrease between the throughput of the base-line simulation and the throughput of simulation for option 2.

The combinations of options that survive the evaluation process (step 1030) are added to a combination option queue (step 1040), and those that do not survive are eliminated. Combinatorial optimizer 220b then determines whether there are any more combinations of network modification options to be evaluated (step 1050) and, if yes, the next combination of network modification options is selected for evaluation (step 1060).

Otherwise, after all combinations of options have been evaluated (steps 1030–1060), the combinations of options in the combination option queue are sorted with combinations that most closely satisfy all user preference data and requirements resulting from the scenario assessment data, architecture assessment data, and cost assessment data of a simulation at the top of the queue (step 1070). The valuation used for this sort is from the value provided by inference engine 740 for each option in a combination (see step 925). The combination option queue is then subjected to a threshold test that eliminates combinations of options below a certain predetermined level, for example, all combinations below the top 500 in the queue (step 1080).

With the network modification options selected by optimizer 220a in one queue and combinations of network modification options selected by combinatorial optimizer 220b in another queue processing by effectiveness analyzer 230 can begin.

Effectiveness Analyzer Procedure

Before effectiveness analyzer 230 begins processing, all combinations of network modification options selected by combinatorial optimizer 220b (i.e., those left in the combination option queue) must be applied to the original network architecture (which was used to create the base-line simulation) and simulator 210 must generate simulations for each. In other words, simulator 210 generates a simulation for the original network architecture as modified by each combination of network modification options.

Figure 11:
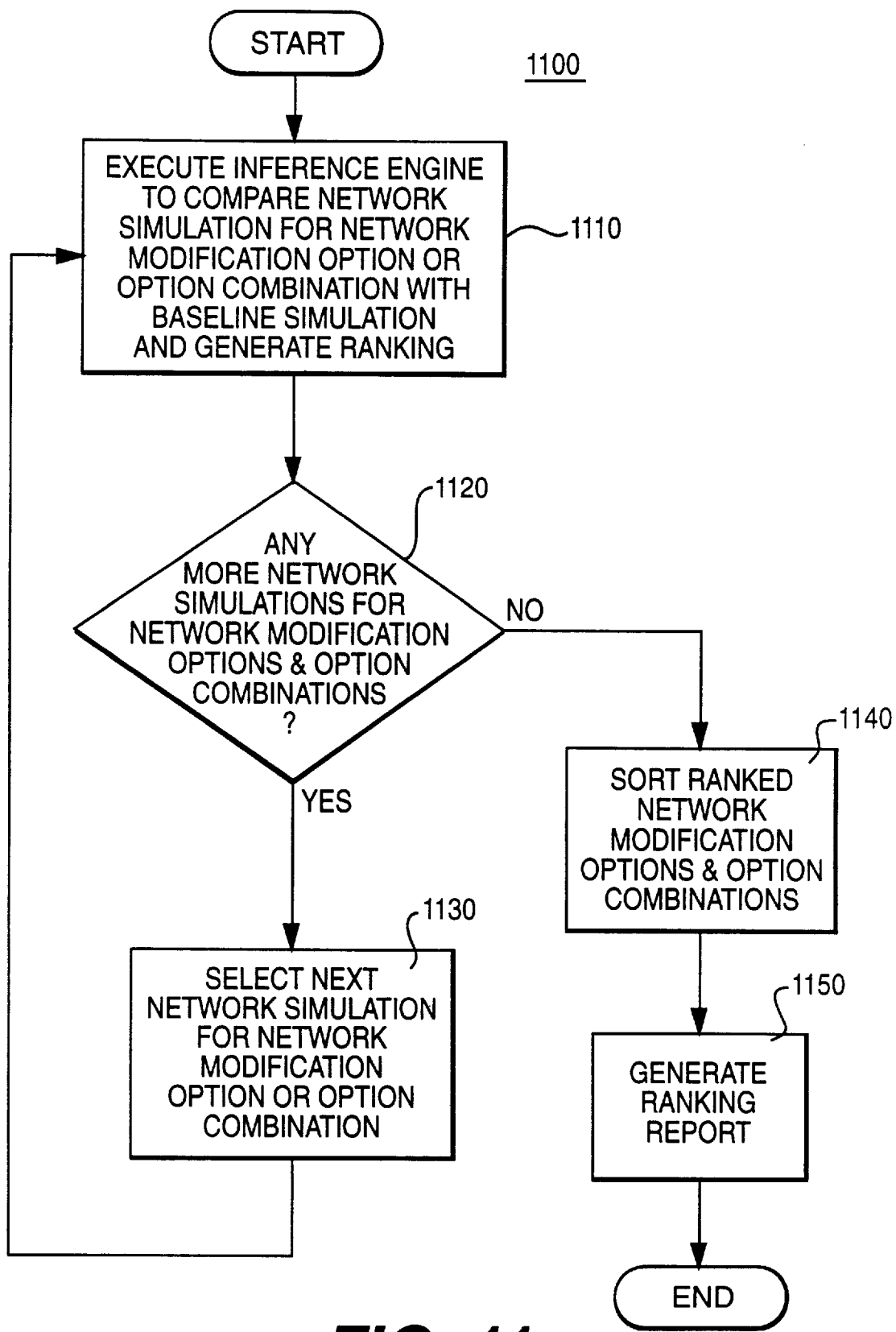
FIG. 11 is a flow chart of an effectiveness analyzing procedure performed by an effectiveness analyzer according to the preferred implementation of the present invention.

FIG. 11 is a flow chart of the effectiveness analyzing procedure 1100 performed by effectiveness analyzer 230 to rank simulations corresponding to the network modification options selected by optimizer 220a and combinations of network modification options selected by combinatorial optimizer 220b. First, effectiveness analyzer 230 uses the inference engine 740 to evaluate statistics such as scenario assessment data, architecture assessment data, and cost assessment data of the base-line simulation for the original network architecture with the same statistics of simulations for the network modification options and combinations of network modification options (step 1110). This comparison provides a delta (or difference) for each value of the scenario assessment data, architecture assessment data, and cost assessment data. These deltas are then applied to rules in knowledge base 750 by inference engine 740.

In this case, inference engine 740 applies the deltas from the comparison of the base-line simulation with the simulation for each modification option and combination to a rule set, which is selected from knowledge base 750 based on which of the deltas is being examined. Inference engine 740 then generates a value (very high, high, moderate, low, very low) for the option or combination based on the deltas and the user preference data.

An example of a rule in knowledge base 750 used for this purpose is:

IF the highest user priority is improving performance and the change in throughput for the option is positive and the change in availability for the option is positive and the change in response time is positive THEN the value of this option is very high.

Effectiveness analyzer 230 then determines whether there are any remaining simulations for network modification options and combinations of network modification options that have not yet been compared to the base-line simulation (step 1120). If yes, then effectiveness analyzer 230 selects the next simulation for a network modification option or combination of network modification options (step 1130) for comparison in step 1110 against the base-line simulation.

When all simulations for network modification options and combinations of network modification options have been compared with the base-line simulation (step 1120), effectiveness analyzer 230 sorts (using values from inference engine 740) the simulations for network modification options and combinations of network modification options by rank (step 1140). The result is a ranked set of options and combinations of options. Effectiveness analyzer 1150 may then generate a ranking report specifying those network modification options and combinations of network modification options that ranked high in the analysis. By keeping track of the decisions made by inference engine 740 during the analysis, effectiveness analyzer 230 may also provide a rationale or list of reasons why specific options and combinations ranked high. Users may then implement the advice provided by NetworkVUE™ 200 in modifying (if appropriate) the network architecture or in designing a new network architecture.

Persons skilled in the art will recognize that the present invention described above overcomes problems and disadvantages of the prior art. They will also recognize that modifications and variations may be made to this invention without departing from the spirit and scope of the general inventive concept. Additionally, throughout the above description of the preferred implementation, other implementations and changes to the preferred implementation were discussed. Thus, this invention in its broader aspects is therefore not limited to the specific details or representative methods shown and described.

We claim:

1. A method of selecting options for modifying a network architecture performed in a data processing system including a knowledge base of rules used to select modification categories and a database including information on a plurality of equipment and a plurality of tariffs, the method comprising the steps of:

receiving a user preference specifying a qualitative factor for optimizing the network architecture;

generating a base-line simulation from the network architecture, the base-line simulation including performance data on the network architecture under a predetermined scenario;

selecting, using at least one rule in the knowledge base, modification categories based on the user preference;

selecting from the database at least one of equipment and tariff information corresponding to at least one of the network modification categories to create modification options for the one of the network modification categories;

generating a plurality of new simulations of the network architecture modified in accordance with the modification options;

comparing the performance data of the base-line simulation with performance data of the new simulations to specify differences in performance data between the base-line simulation and each new simulation;

ordering the modification options, each corresponding to one of the new simulations, using the specified differences in performance data between the base-line simulation and each new simulation, the user preference, and at least one rule of the knowledge base;

generating combinations of the modification options;

eliminating, using at least one rule in the knowledge base, ones of the combinations of modification options based on the user preference;

generating a plurality of new combination simulations of the network architecture as modified by the combinations of modification options;

comparing the performance data of the base-line simulation with performance data of the new combination simulations to specify differences in performance data between the base-line simulation and each new combination simulation; and ordering the modification options, each corresponding to one of the new combination simulations, using the specified differences in performance data between the base-line simulation and each new combination simulation, user preference, and at least one rule of the knowledge base.

2. The method of claim 1 further comprising the step of:
generating a report specifying the ordered modification options and listing for each modification option of the rule from the knowledge base used to order the option.

3. A program storage device readable by a machine and encoding a program of instruction for executing the method steps specified in claim 2.

4. A program storage device readable by a machine and encoding a program of instruction for executing the method steps specified in claim 1.

5. A method of selecting options for modifying a network architecture performed in a data processing system including a knowledge base of rules used to select modification options, the method comprising the steps of:

receiving a user preference specifying a qualitative factor optimizing the network architecture;

generating a base-line simulation from the network architecture, the base-line simulation including performance data on the network architecture under a predetermined scenario;

generating, using at least one rule in the knowledge base, modification options based on the user preference;

generating a plurality of new simulations of the network architecture as modified based on the modification options;

ranking the modification options, each corresponding to one of the new simulations, according to differences in performance data between the base-line simulation and each new simulation and according to the user preference;

generating combinations of the modification options;

eliminating, using at least one rule in the knowledge base, ones of the combinations of modification options based on the user preference;

generating a plurality of new combination simulations of the network architecture as modified by the combinations of modification options; and ranking the modification options, each corresponding to one of the new combination simulations, according to differences in performance data between the base-line simulation and each new combination simulation and according to the user preference.

6. A method of selecting options for modifying a network architecture, the method comprising the steps of:

creating a base-line simulation from the network architecture and a scenario specifying at least one transmission in the network architecture, the base-line simulation including performance data on the network architecture under conditions of the scenario;

identifying network modifications from the base-line simulation using data from a tariff/hardware database and in accordance with user preferences that specify qualitative factors for altering the input network architecture;

creating new simulations for the network architecture as modified by each network modification, the new simulations including performance data on the network architecture as modified by each network modification under conditions of the scenario;

combining the network modifications from the new simulations using data from the tariff/hardware database and in accordance with the user preferences;

creating combination simulations for the network architecture as modified by each of the combinations of network modifications, the combination simulations including performance data on the network architecture as modified by each of the combinations of network modifications under conditions of the scenario;

comparing the base-line simulation with the new simulations for the network architecture as modified by each network modification and the combination simulations for the network architecture as modified by each of the combinations of network modifications to identify differences between the performance data of the base-line simulation and the performance data of each of the new simulations and combination simulations; and ranking the network modifications and the combinations of network modifications in accordance with the differences between the performance data of the base-line simulation and the performance data of each of the new simulations and combination simulations.

7. A computer system for selecting options for modifying a network architecture, the computer system comprising:

a simulator for generating a base-line simulation from the network architecture and a scenario specifying at least one transmission in the network architecture and using at least one of transmission, cost, and equipment data from a database, the base-line simulation including performance data on the network architecture under conditions of the scenario; and an optimizer for generating network modifications from the base-line simulation using equipment data from the database and in accordance with user preferences defining qualitative factors for altering the input network architecture, wherein the simulator includes:

means for generating new simulations for the network architecture as modified by each network modification generated by the optimizer, the new simulations including performance data on the network architecture as modified by each network modification under conditions of the scenario, and means for generating combination simulations for the network architecture as modified by each of the combinations of network modifications generated by the combinatorial optimizer, the combination simulations including performance data on the network architecture as modified by each of the combinations of network modifications under conditions of the scenario, and wherein the optimizer includes:

a combinatorial optimizer for generating combinations of network modifications from the new simulations using equipment data from the database and in accordance with the user preferences that specify the manner in which a user would prefer to maintain, use, or alter the input network architecture.

8. The computer system of claim 7 further comprising an effectiveness analyzer for comparing the base-line simulation with the new simulations for the network architecture as modified by each network modification generated by the optimizer and each of the combination simulations for the network architecture as modified by each of the combinations of network modifications generated by the combinatorial optimizer to identify differences between the performance data of the base-line simulation and the performance data of each of the new simulations and combination simulations.

9. The computer system of claim 8 wherein the effectiveness analyzer includes means for ranking the network modifications generated by the optimizer and the combinations of network modifications generated by the combinatorial optimizer in accordance with the differences between the performance data of the base-line simulation and the performance data of each of the new simulations and combination simulations.

10. A system for selecting options for modifying a network architecture using a knowledge base of rules for selecting modification categories and a database including information on a plurality of equipment and a plurality of tariffs, the system comprising:

means for receiving a user preference specifying a qualitative factor for optimizing the network architecture;

means for generating a base-line simulation from the network architecture, the base-line simulation including performance data on the network architecture under a predetermined scenario;

means for selecting, using at least one rule in the knowledge base, modification categories based on the user preference;

means for selecting from the database at least one of equipment and tariff information corresponding to at least one of the network modification categories to create modification options for the one of the network modification categories;

means for generating a plurality of new simulations of the network architecture as modified by the modification options;

means for comparing the performance data of the base-line simulation with performance data of the new simulations to specify differences in performance data between the base-line simulation and each new simulation;

means for ranking the modification options, each corresponding to one of the new simulations, using the specified differences in performance data between the base-line simulation and each new simulation, user preference, and at least one rule of the knowledge base;

means for generating combinations of the modification options;

means for eliminating, using at least one rule in the knowledge base, ones of the combinations of modification options based on the user preference;

means for generating a plurality of new combination simulations of the network architecture as modified by the combinations of modification options;

means for comparing the performance data of the base-line simulation with performance data of the new combination simulations to specify differences in performance data between the base-line simulation and each new combination simulation; and means for ranking the modification options, each corresponding to one of the new combination simulations, using the specified differences in performance data between the base-line simulation and each new combination simulation, user preference, and at least one rule of the knowledge base.

11. A system for selecting options for modifying a network architecture using a knowledge base of rules used to select modification options, the system comprising:

means for receiving a user preference specifying a qualitative factor for optimizing the network architecture;

means for generating a base-line simulation from the network architecture, the base-line simulation including performance data on the network architecture under a predetermined scenario;

means for generating, using at least one rule in the knowledge base, modification options based on the user preference;

means for generating a plurality of new simulations of the network architecture as modified based on the modification options; and means for ranking the modification options, each corresponding to one of the new simulations, according to differences in performance data between the base-line simulation and each new simulation and according to the user preference;

means for generating combinations of the modification options;

means for eliminating, using at least one rule in the knowledge base, ones of the combinations of modification options based on the user preference;

means for generating a plurality of new combination simulations of the network architecture as modified by the combinations of modification options; and means for ranking the modification options, each corresponding to one of the new combination simulations, according to differences in performance data between the base-line simulation and each new combination simulation and according to the user preference.

* * * * *